US012088015B2

(12) United States Patent
Flordelis et al.

(10) Patent No.: US 12,088,015 B2
(45) Date of Patent: Sep. 10, 2024

(54) ANTENNA ASSEMBLY HAVING ANTENNA ELEMENTS IN HELICAL PATTERN

(71) Applicant: Sony Group Corporation, Tokyo (JP)

(72) Inventors: Jose Flordelis, Lund (SE); Kun Zhao, Malmö (SE); Olof Zander, Södra Sandby (SE); Erik Bengtsson, Eslöv (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 126 days.

(21) Appl. No.: 17/908,842

(22) PCT Filed: Feb. 19, 2021

(86) PCT No.: PCT/US2021/018694
§ 371 (c)(1),
(2) Date: Sep. 1, 2022

(87) PCT Pub. No.: WO2021/188251
PCT Pub. Date: Sep. 23, 2021

(65) Prior Publication Data

US 2023/0095720 A1 Mar. 30, 2023

(30) Foreign Application Priority Data

Mar. 27, 2020 (SE) .................................... 2050341-3

(51) Int. Cl.
*H01Q 21/06* (2006.01)
*H01Q 1/38* (2006.01)

(52) U.S. Cl.
CPC ............. *H01Q 21/065* (2013.01); *H01Q 1/38* (2013.01)

(58) Field of Classification Search
USPC .......................................................... 343/895
See application file for complete search history.

(56) References Cited

U.S. PATENT DOCUMENTS

2004/0008153 A1* 1/2004 Lamensdorf ......... H01Q 9/0407 343/895
2011/0037679 A1* 2/2011 Shlager .................. H01Q 11/08 343/895
(Continued)

FOREIGN PATENT DOCUMENTS

CN 105071034 A 11/2015
CN 106329108 A 1/2017
(Continued)

OTHER PUBLICATIONS

Fei Shen et al., "Generation of Continuously Variable-Mode Vortex Electromagnetic Waves With Three-Dimensional Helical Antenna", IEEE Antennas and Wireless Propagation letters, vol. 18, No. 6, Jun. 2019, 5 pages.*

(Continued)

*Primary Examiner* — Hoang V Nguyen
*Assistant Examiner* — Brandon Sean Woods
(74) *Attorney, Agent, or Firm* — Tucker Ellis LLP

(57) ABSTRACT

An antenna assembly (10) includes a substrate (24) and an array of antenna elements (26). Each antenna element is supported by the substrate at respective locations so that the antenna elements are arranged in space in a helix pattern (28). The helix pattern has a pitch along an axis about which the helix pattern turns. An arc length spacing of the antenna elements along the helix pattern and the pitch are arranged so that, in a transmit mode, a radio frequency (RF) signal fed to each of the antenna elements results in emission of a radiated signal with a rotational wave front from the antenna assembly at a first frequency and a first mode.

21 Claims, 4 Drawing Sheets

(56) References Cited

U.S. PATENT DOCUMENTS

| | | | | |
|---|---|---|---|---|
| 2012/0092230 | A1 * | 4/2012 | Hung | H01Q 11/08 343/895 |
| 2013/0235744 | A1 | 9/2013 | Chen | |
| 2016/0028163 | A1 | 1/2016 | Li | |
| 2016/0043794 | A1 | 2/2016 | Ashrafi | |
| 2016/0261036 | A1 | 9/2016 | Sato | |

FOREIGN PATENT DOCUMENTS

| | | | | | |
|---|---|---|---|---|---|
| CN | 108199135 | A | * | 6/2018 | H01Q 1/36 |
| DE | 102016010738 | A1 | | 3/2018 | |
| EP | 2551715 | A1 | * | 1/2013 | G02B 26/06 |
| JP | 2015027042 | A | | 2/2015 | |
| WO | WO-2014199451 | A1 | | 12/2014 | |
| WO | 2019237249 | A1 | | 12/2019 | |

OTHER PUBLICATIONS

Zheyuan Zheng et al., "Mode-tunable Orbital Angular Momentum Beam Realized by Multi-arm Conical Helical Antenna", IEEE International Conference on Computational Electomagnetics (ICCEM), Mar. 20, 2019, 3 pages.*

Jiangnan Mu et al., "Generation of Multi-mode Vortex Electromagnetic Waves Based on Helical Antenna", IEEE The 10th International Conference on Communications, Circuits and Systems, Dec. 22, 2018, 4 pages.*

International Search Report from corresponding International Application No. PCT/EP2021/018694, mailed on May 17, 2021, 12 pages.

Office Action and Search Report from corresponding Swedish Application No. 2050341-3, mailed on Nov. 26, 2020, 6 pages.

F. Tamburini et al., "Experimental demonstration of free-space information transfer using phase modulated orbital angular momentum radio", Feb. 14, 2013, 7 pages.

Rui Chen et al., "Orbital Angular Momentum Waves: Generation, Detection and Emerging Applications", IEEE Communications Surveys & Tutorials, Nov. 2019, 31 pages.

Seng Fatt Liew et al., "Localized photonic band edge modes and orbital angular momenta of light in a golden-angle spiral", Optics Express Nov. 7, 2011, vol. 1 9, No. 24, p. 23631, DOI: 10. 1364/0E.19.023631.

* cited by examiner

ANTENNA ASSEMBLY HAVING ANTENNA ELEMENTS IN HELICAL PATTERN

RELATED APPLICATION DATA

This application claims the benefit of U.S. Provisional Patent Application No. 62/990,706, filed Mar. 17, 2020, and Swedish Patent Application No. 2050341-3, filed Mar. 27, 2020, the disclosures of which are incorporated herein by reference in their entireties.

TECHNICAL FIELD OF THE INVENTION

The technology of the present disclosure relates generally to antenna assemblies used primarily in data communication links and, more particularly, to an antenna assembly having antenna elements that are arranged in a helical pattern, which may be used to support the generation of a radiated signal with orbital angular momentum (OAM) without a phase tuner in the feeding network.

BACKGROUND

Various approaches have been proposed to achieve robust communication links with large data handling capacity between wireless devices. One approach is the use of multiple-input, multiple-output (MIMO) antenna arrangements. In an even more specific approach, MIMO may be implemented with radiated signals having orbital angular momentum (OAM). An advantage of OAM over some other MIMO approaches is a relaxation in signal processing.

But there are limitations and challenges with currently available techniques for generating radiated signals with OAM properties. For example, multi-mode OAM transmissions requires the transmit and receive antennas to be a short distance from one another (e.g., within each other's near-field). The reason is that higher modes tend to be more dispersive in the spatial domain. Also, the transmitting and receiving antennas need to be aligned toward each other.

FIG. 1 schematically illustrates a conventional OAM antenna array 1. The OAM antenna array 1 includes a planar ring of antenna elements 2 (eight elements in the illustrated example) where there is the same arc length between each adjacent pair of antenna elements 2. The antenna elements 2 are fed with a signal with an increasing phase offset to achieve the desired mode, where the total phase shift is 360 degrees for a full turn of the antenna elements 2.

In FIG. 1, an input phase of the radio frequency (RF) signal fed to each antenna element 2 for mode one is shown next to each antenna element 2. A corresponding far-field radiation pattern 3 is illustrated in FIG. 2 for a relatively high mode. The application to communications in the near-field of the antenna array 1 may be understood from FIG. 2 due to the dispersive (i.e., cone-shape) property in the intended propagation direction of the pattern 3. The further the transmitting and receiving antenna arrays 1 are away from each other, the less energy will be received.

Different modes may be implemented by feeding RF signals to the antenna elements 2 with different phase offsets. For instance, referring to FIG. 3A, mode zero (n=0) may be achieved by feeding the RF signal to the antenna elements 2 with no phase offset. Referring to FIGS. 1 and 3B, mode one (n=+1) may be achieved by feeding the RF signal to the antenna elements 2 with a 45° degree phase offset. Referring to FIG. 3C, mode two (n=+2) may be achieved by feeding the RF signal to the antenna elements 2 with a 90° degree phase offset.

To achieve the phase offsets for one or more modes, the feeding network for the antenna elements 2 must be relatively complex and include phase shifters. Since the bandwidth of phase shifters is limited, the operational bandwidth of the OAM antenna array may be limited as well.

SUMMARY

Disclosed are antenna systems that are arranged to reduce the complexity of a feeding network that feeds an RF signal to antenna elements used for the generation of a radio frequency (RF) signal with a rotational wave front, such as a helical wave, a twisted wave, or a wave having OAM. In one embodiment, the antenna elements are arranged in a helix pattern with elevation differences between the antenna elements. In this manner, even if the same RF signal is fed to each antenna element without any phase offsets among the antenna elements, the structural arrangement of the antenna elements will result in the emission of RF signals from the antenna elements that have respective phase differences relative to a phase reference plane that is perpendicular to an axis of the helix pattern. In one embodiment, a phase shifter in the feeding network may be avoided, thereby increasing the bandwidth of the antenna system and reducing insertion loss in the feeding network. As a receive antenna for an RF signal with a rotational wave front, each antenna element of the antenna system will output a received RF signal with a phase offset corresponding to the elevation differences relative to the axis of the helix pattern.

According to an aspect of the disclosure, an antenna assembly includes a substrate and an array of antenna elements. Each antenna element is supported by the substrate at respective locations so that the antenna elements are arranged in space in a helix pattern. The helix pattern has a pitch along an axis about which the helix pattern turns. An arc length spacing of the antenna elements along the helix pattern and the pitch are arranged so that, in a transmit mode, a radio frequency (RF) signal fed to each of the antenna elements results in emission of a radiated signal with a rotational wave front from the antenna assembly at a first frequency and a first mode.

DETAILED DESCRIPTION OF EMBODIMENTS

Figure 1:
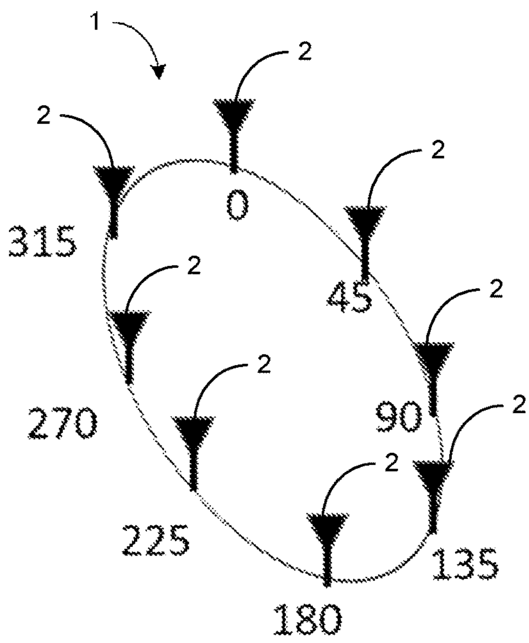
FIG. 1 Prior Art
FIG. 1 is a schematic representation of a conventional antenna array used for generating a radiated signal having OAM properties.
Figure 2:
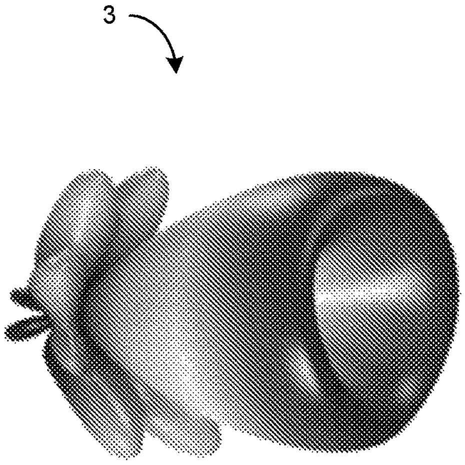
FIG. 2 Prior Art
FIG. 2 is a radiation pattern emitted by the antenna array of FIG. 1.
Figure 3A:
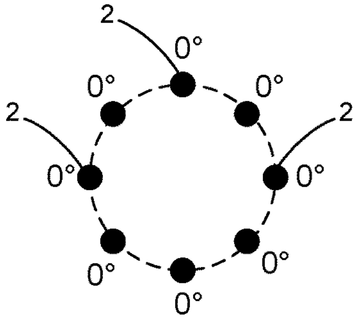
FIG. 3A Prior Art
FIG. 3A is another schematic representation of the antenna array of FIG. 1 showing phase offsets to emit a radiated signal with mode zero OAM.
Figure 3B:
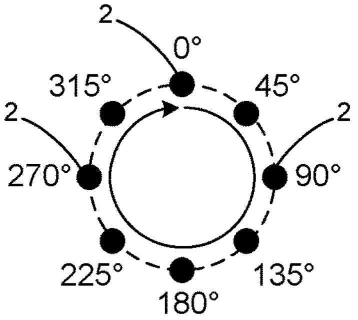
FIG. 3B Prior Art
FIG. 3B is another schematic representation of the antenna array of FIG. 1 showing phase offsets to emit a radiated signal with mode one OAM.
Figure 3C:
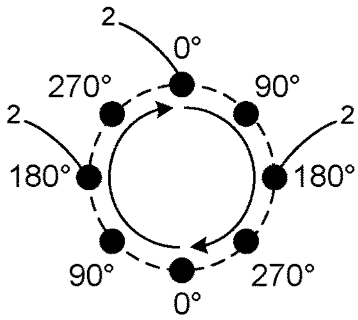
FIG. 3C Prior Art
FIG. 3C is another schematic representation of the antenna array of FIG. 1 showing phase offsets to emit a radiated signal mode two OAM.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Exemplary Environment

Figure 4:
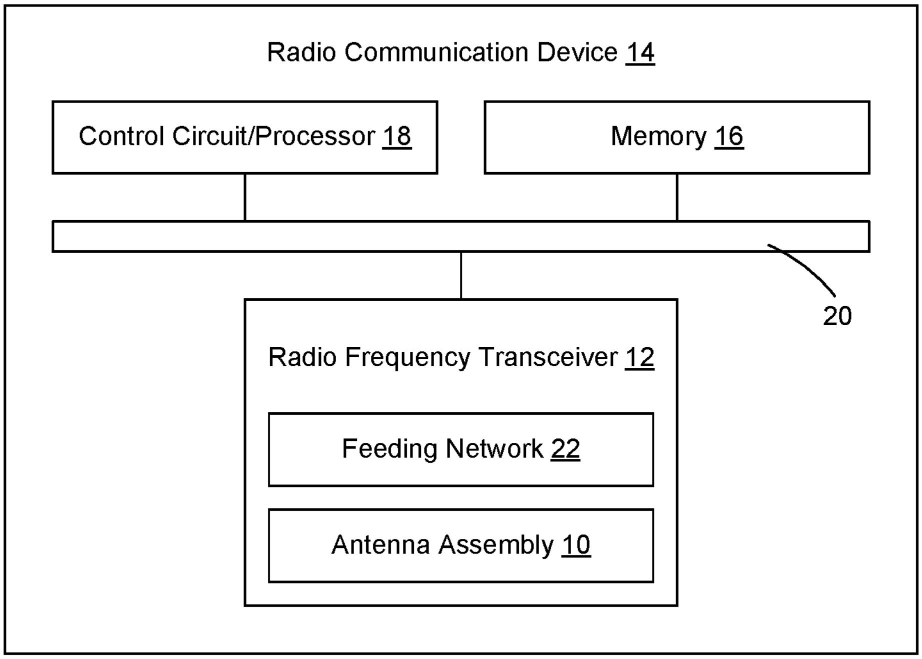
FIG. 4 is a schematic diagram of a radio communication device having a radio frequency transceiver that includes an antenna assembly according to the present disclosure.

With reference to FIG. 4, aspects of this disclosure relate to an antenna assembly 10. The antenna assembly 10 may form part of a radio frequency transceiver 12 that is used by or part of a radio communications device 14 for engaging in wireless radio communications with another radio communications device (not shown). The radio frequency transceiver 12 may be used to transmit signals, to receive signals, or both transmit and receive signals. The radio communications device 14 may be or form part of any appropriate device. An exemplary radio communications device 14 is a network node having a fixed location that transmits signals to and/or receives signals from another fixed location network node via the antenna assembly 10, such as for backhaul operations to support client devices in the network. Another exemplary radio communications device 14 is an Internet of Things (IoT) device that communicates in a wireless network using, for example, machine-type communication or machine-to-machine communication. Another exemplary radio communications device 14 is a network node (e.g., base station or access point) that supports communication with a client device of a network. Since data communications via the antenna assembly 10 work best in the near-field of the antenna assembly 10, most instances of the radio communications device 14 will be fixed location devices or devices with known trajectory to the radio communications device with which communications will be made. But it is possible that the antenna assembly 10 may be employed in a mobile radio communication device.

FIG. 4 illustrates a schematic block diagram of the radio communications device 14. The radio communications device 14 may be implemented as a computer-based system that is capable of executing computer applications (e.g., software programs) that, when executed, carry out functions of the radio communications device 14. Other arrangements may be made, such a device that has dedicated circuitry for carrying out predetermined logical operations.

In one embodiment, the radio communications device 14 includes a non-transitory computer readable medium, such as a memory 16 that stores data, information sets and software, and a processor 18 for executing the software. The processor 18 and the memory 16 may be coupled using a local interface 20. The local interface 20 may be, for example, a data bus with accompanying control bus, a network, or other subsystem. The radio communications device 14 may have other components, which are not illustrated. For example, the radio communications device 14 may have various input/output (I/O) interfaces for operatively connecting to various peripheral devices, may have a display, may have one or more user input devices (e.g., buttons, keypads, touch screens, etc.), may have one or more sensors or data collection devices, and/or may have one or more communications interfaces other than the radio frequency transceiver 12.

The radio frequency transceiver 12 may include for example, a modem or other signal processing device that is operatively coupled to the antenna assembly 10 by way of a feeding network 22. In a transmit mode, the feeding network 22 feeds an RF signal to each of plural antenna elements (discussed below) of the antenna assembly 10. In one embodiment, the feeding network 22 does not include phase shifters to adjust the relative phase of the RF signal fed to the antenna elements. In a receive mode, the feeding network 22 couples signals output by each antenna element to the modem or other signal processing device.

Antenna Assembly

Figure 5:
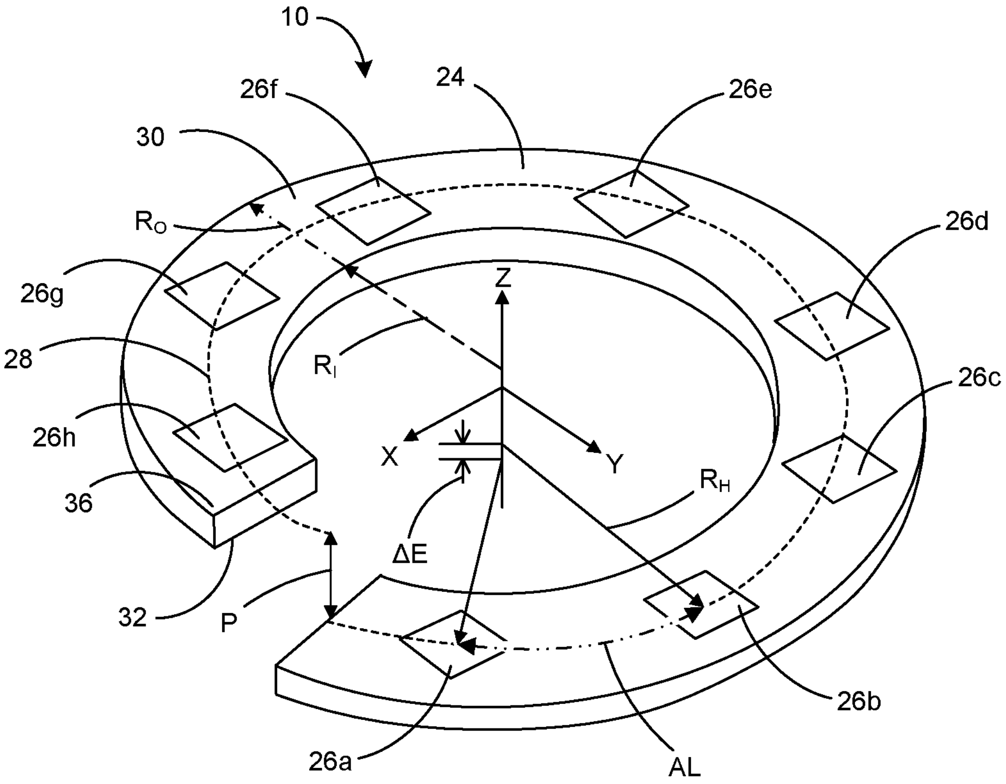
FIG. 5 is a schematic diagram of a representative antenna assembly according to the present disclosure, shown in perspective.

With additional reference to FIG. 5, shown is an exemplary embodiment of the antenna assembly 10. The antenna assembly 10 includes a substrate 24 that supports an array of antenna elements 26. For transmission of an RF signal by the antenna assembly 10, the antenna elements 26 are each fed with a respective RF signal from the feeding network 22 by way of an appropriate conductor (not shown), such as a microstrip line, that is supported by the substrate 24. The antenna elements 26 may be made up of microstrip lines or may have another arrangement such as, but not limited to, a patch antenna element.

The antenna elements 26 are supported by the substrate 24 so that they are arranged in space in a helix pattern 28 (depicted with a broken line). For reference, x, y and z axes of a Cartesian reference system are also illustrated in FIG. 5. The z axis represents the axis of the helix pattern 28 (i.e., the axis about which the helix pattern 28 turns). In the illustrated embodiment, the helix pattern 28 is a single ring of a circular helix. The helix pattern 28 may have a constant radius $R_H$ when drawn through the antenna elements 26 so that the helix pattern 28 has constant band curvature and constant torsion. The illustrated helix pattern 28 is a right-handed helix, but could be implemented with a left-handed helix. The term "pitch," as used herein and represented by arrow P, is the height of one complete turn helix pattern 28. The pitch is measured parallel to the axis of the helix pattern 28. The term "elevation," as used herein, is a parameterized point along the axis of the helix pattern 28. The x and y axes are normal to the axis of the helix pattern 28. A phase reference plane for the antenna assembly 10 is also normal to the axis of the helix pattern 28 and may be located at any elevation, such as an elevation of a first one of the antenna elements 26*a* in the array.

In the illustrated embodiment, there are eight antenna elements 26, labeled 26*a* through 26*h*. There may be more than or less than eight antenna elements 26. For instance, there may be four antenna elements 26 to sixteen (or more) antenna elements 26.

In the illustrated embodiment, the substrate 24 also is in the shape of a helix. The substrate 24 has an upper surface 30 that supports the antenna elements 26 and an opposing lower surface 32. The substrate 24 has an inner radius $R_I$ measured from the axis of the helix pattern 28 and an outer radius $R_O$ measured from the axis of the helix pattern 28. The radius $R_H$ of the helix pattern 28 lies between the inner radius $R_I$ and the outer radius $R_O$. In one embodiment, at every elevation, the radius $R_H$, the inner radius $R_I$, and the outer radius $R_O$ are substantially coplanar and substantially normal to the axis of the helix pattern 28. As used herein, there term "substantially" means with ten percent or less variation.

In the embodiment of FIG. 5, the upper surface 30 of the substrate 24 has a slope. Therefore, the antenna elements 26 may be inclined at the corresponding local slope of the substrate 24. As a result, an emission pattern from each antenna element 26 may be offset form the axis of the helix pattern 28 by a small angle. For a helix pattern 28 with a substantially constant slope, the offset angle will be substantially the same for each antenna element 26. Thus, a wave front emitted by the antenna assembly 10 will be offset from the axis of the helix pattern 28. In one embodiment, the offset is not significant to the wireless communications carried out using the antenna assembly 10 and may be ignored. In another embodiment, compensation may be made for the offset to make the emission pattern from each antenna element 26 more parallel to the axis of the helix pattern 28. For instance, the substrate 24 may be mounted to an underlying component (e.g., a printed circuit board, not shown) of the radio communication device 14 at a compensating angle. Alternatively, the substrate 24 may be formed with local changes in slope on the upper surface 30 at the positions of the antenna elements 26 to compensate for the offset angle.

In one embodiment, a spacing between each adjacent pair of antenna elements 26 may be determined in advance of wireless communications (e.g., the spacing may be "predetermined"). As will be described, the spacing may be fixed or may be variable to support multiple frequencies and/or multiple modes. In the latter case, more than one predetermined spacing may be determined. In one embodiment, the spacing is measured by an arc length (represented in FIG. 5 by arrow AL) of the helix pattern 28 between pairs of antenna elements 26 and/or is measured by a physical difference in elevation (or axial length represented in FIG. 5 by arrow ΔE) between pairs of antenna elements 26. In one embodiment, the antenna elements 26 are equally arranged along the helix pattern 28 so that the antenna elements 26 in each adjacent pair of antenna elements 26 are spaced apart by substantially the same arc length AL and by substantially the same axial length ΔE along the axis about which the helix pattern 28 turns. In this embodiment, the axial length ΔE between adjacent antenna elements 26 is approximately the pitch divided by the number of antenna elements 26. In one embodiment, a pitch of one wavelength may be used to support emission of a radiated signal in one mode and a pitch of two wavelengths may be used to support emission of a radiated signal in another mode. Different modes will have wave fronts with different twist rates in the direction of propagation.

The spacing of the antenna elements 26 along the helix pattern 28 and the pitch may be predetermined so that, in a transmit mode, the same RF signal fed to each of the antenna elements 26 with the same phase results in emission of a radio frequency radiated signal with a rotational wave front from the antenna assembly 10 at a frequency and a mode corresponding to the RF signal and the physical arrangement of the helix pattern 28. With the proper selection of the RF signal and the physical arrangement of the helix pattern 28, the rotational radiated wave front may be a helical or twisted (e.g., spiral) wave front. Further, the radiated signal with rotational wave front emitted by the antenna assembly may have orbital angular momentum (OAM), even though no phase offsets are introduced to the RF signal that is fed to the antenna elements 26. Rather, the rotational radiated wave front results from the physical arc length and elevation spacing differences between the antenna elements 26 of the antenna assembly 10. Specifically, these differences result in each antenna element 26 emitting a component of the radiated signal of the antenna assembly 10 that has a difference in phase relative to a phase reference plane perpendicular to the axis of the helix pattern 28.

In this manner, a phase shifter in the feeding network 22 may not be present. That is, the feeding network 22 may be without a phase shifter. Thus, the OAM radiated signal is emitted without feeding the RF signal to the antenna elements 26 with phase offset (e.g., by not passing the RF signal through a phase shifter to adjust phase of the RF signal). Additionally, no signal processing to introduce a phase shift to the RF signal for each antenna element 26 is needed.

In another embodiment, a phase shifter is present to work in conjunction with the physical arrangement of the helix pattern 28. For example, two or more operational modes may be supported using the phase shifter and the physical arrangement of the helix pattern 28. To support one mode (e.g., mode one), the phase shifter does not introduce any phase offset to the RF signal fed to the antenna elements 26, but a rotational radiated wave front is emitted from the antenna assembly 10 as described. To support another mode (e.g., mode two or higher), the phase shifter introduces phase offset to the RF signal fed to the antenna elements 26. These phase offsets combine with the physical arrangement of the helix pattern 28 to emit a rotational radiated wave front from the antenna assembly 10 at the other mode.

Omitting a phase shifter from the feeding network 22 may have significant reductions in insertion loss compared to a feeding network 22 with a phase shifter. For instance, without a phase shifter, a single PA/LNA (i.e., power amplifier for transmission and low noise amplifier for reception) may be used to feed all antenna elements via a splitter, which may result in smaller insertion loss. Moreover, if each antenna element has an associated phase-shifter (each having an associated insertion loss), then it would be desirable to have a PA/LNA located after the phase-shifters, and hence, the PA/LNAs would be distributed to each antenna element. As a result, a reduction in hardware component count may be realized when a phase shifter is omitted.

Figure 6:
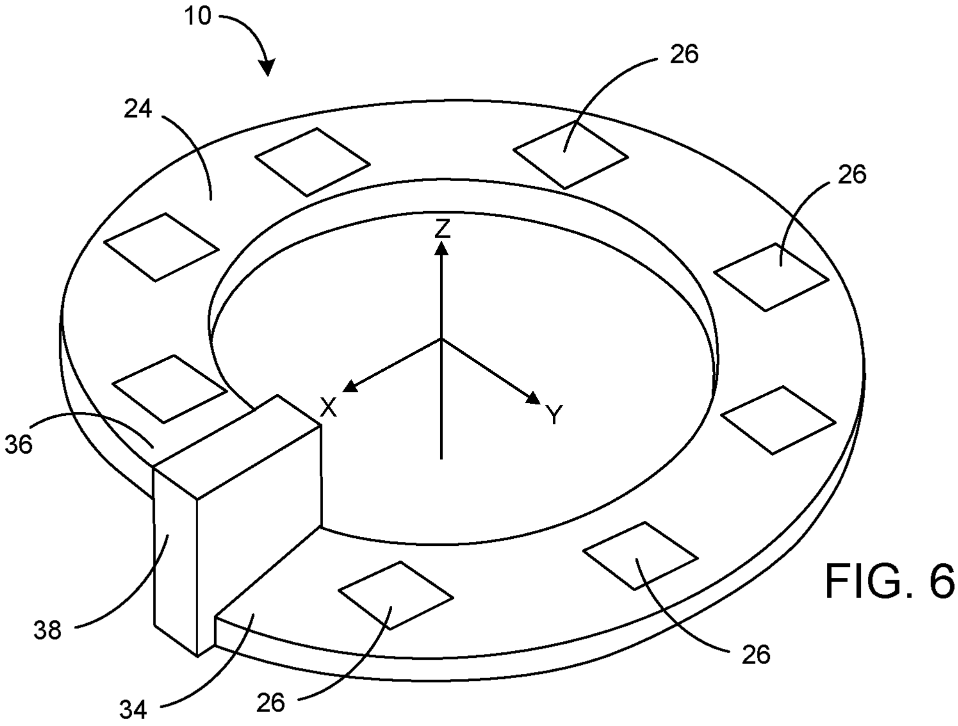
FIG. 6 is a schematic diagram of another representative antenna assembly according to the present disclosure, shown in perspective.

With additional reference to FIG. 6, the substrate 24 may have a first end 34 (e.g., at a lowest elevation of the helix pattern 28) and a second end 36 (e.g., at a highest elevation of the helix pattern 28). A support structure 38 may directly or indirectly connect to the first end 34 and the second end 36 to support the substrate 24. The support structure 38 also may connect the substrate 24 to an underlying structure in the radio communication device 14. The underlying structure may be, for example, a printed circuit board (not shown). Additional support elements between the substrate 24 and the underlying structure may be present. Alternatively, the substrate may for a body that partially or fully fills a volume between the lower surface 32 of the substrate 24 and the underlying structure.

Figure 7A:
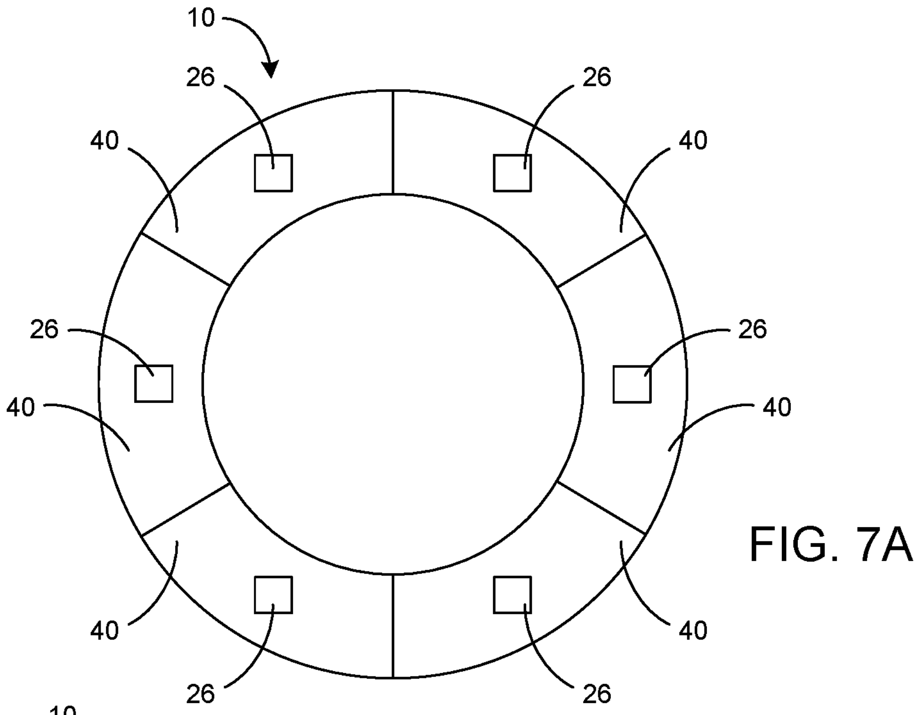
FIG. 7A is a schematic diagram of another representative antenna assembly according to the present disclosure, shown as a top view.
Figure 7B:
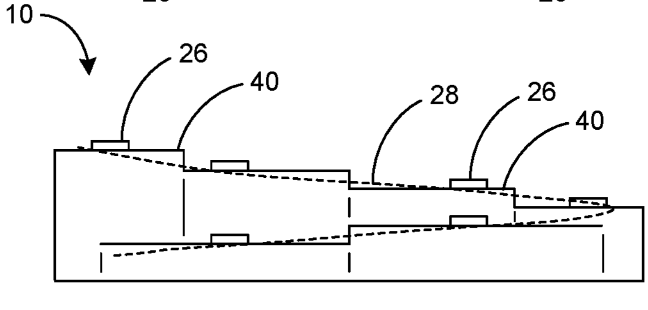
FIG. 7B is another schematic diagram of the antenna assembly of FIG. 7A, shown as a side view.

With additional reference to FIGS. 7A and 7B, another embodiment of the antenna assembly 10 is illustrated. In this embodiment, the substrate 26 is not itself a helix but still supports the antenna elements 26 in the helix pattern 28. In the illustrated embodiment, the substrate 24 has a series of steps 40 to respectively support the antenna elements 26.

Thus, the substrate 24 may be considered to have a plurality of features that are discontinuous in elevation with respect to the axis of the helix pattern 28 to respectively support each of the antenna elements 26 in the helix pattern 28. In the illustrated embodiment, the steps 40 are interconnected and form a ring. In another embodiment, the features that support the antenna elements 26 are mesas.

Polarization and Radiation Pattern Characteristics

To facilitate emission of a radiated signal from the antenna assembly 10 with a rotational wave front, each antenna element 26 may emit a wave front having substantially the same polarization (e.g., each antenna element 26 may be "co-polarized"). In one embodiment, each antenna element 26 is constructed relative to a main axis of the antenna element to achieve desired polarization characteristics. Therefore, orientation of each antenna element 26 relative to the other antenna elements 26 along the helix pattern 28 may be considered. In one embodiment, the main axes of the antenna elements 26 are oriented parallel to one another so that each antenna element 26 respectively emits a signal corresponding to the RF signal fed to the antenna elements with substantially the same polarization. In one embodiment, the radiated wave from each antenna element 26 has substantially the same phase pattern, substantially the same polarization, and substantially the same gain pattern. The RF signal may be fed to the antenna elements 26 to produce emissions with a "positively rising" phase offset relative to the helix pattern 28 or a "negatively rising" (e.g., sinking) phase offset relative to the helix pattern 28. In this manner, the antenna assembly 10 is capable of generating both positive and negative OAM modes.

In one embodiment, each antenna element supports emission of two signals with different polarizations to increase transmission capacity of the antenna assembly 10. In this case, each antenna element 26 may be connected to two feed lines (not shown) from the feeding network 22. For instance, the different polarizations may be horizontally polarized and vertically polarized. Other polarizations, either alone or in combination with another polarization are possible. Exemplary polarizations include, horizontal polarization, vertical polarization, 45 degree slant polarization, left-hand circular polarization, and right-hand circular polarization.

Variable Pitch

Figure 8A:
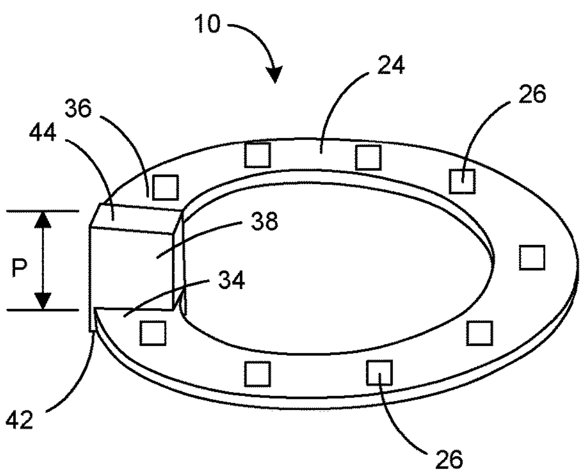
FIGS. 8A and 8B are schematic diagrams of another representative antenna assembly according to the present disclosure, shown respectively with a first pitch P and a second pitch P'.
Figure 8B:
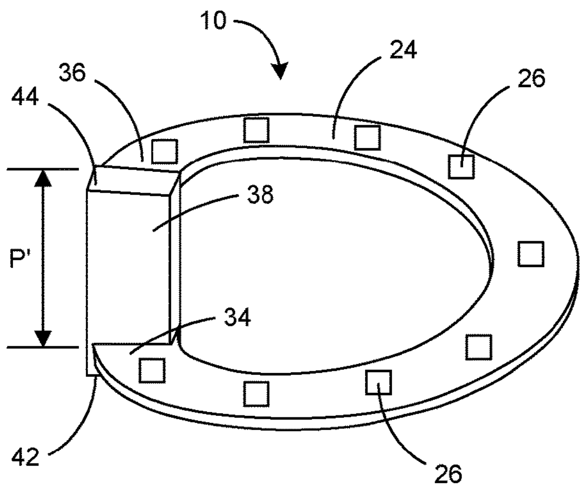

With additional reference to FIGS. 8A and 8B, an embodiment of the antenna assembly 10 with a variable pitch P is illustrated. In this embodiment, the substrate 24 may be made from a flexible material, such as a flexible plastic substrate. Exemplary materials include, but are not limited to, polyimide, polyetheretherketone (PEEK), and polyester film.

As indicated, the first end 34 of the substrate 24 may be directly or indirectly connected to a lower end 42 of the support structure 38 and the second end 36 of the substrate 24 may be directly or indirectly connected to an upper end 42 of the support structure 38. To vary the pitch P of the helix pattern 28, support structure 38 may have an axial length with respect to the axis of the helix pattern 28 that is changeable. Changing the axial length of the support structure 38 correspondingly flexes the substrate 24 and expands or contracts the pitch P of the helix pattern 28. In one embodiment, the axial length of the support structure 28 may be varied to have a first axial length corresponding to a first pitch P of the helix pattern 28 and a second axial length corresponding to second pitch P' of the helix pattern 28. In another embodiment, the axial length of the support structure 28 may have multiple lengths between the first and second axial lengths so that more than two pitches of the helix pattern 28 may be achieved.

Thus, the pitch of the helix pattern 28 is variable by physical manipulation of the substrate 24. Changing the pitch of the helix pattern 28 will also result in a corresponding change in axial elevation ΔE (FIG. 5) between each adjacent pair of the antenna elements 26. This will change a phase offset between radiated signals emitted by each adjacent pair of the antenna elements 26. As a result, the antenna assembly 10 with variable pitch of the helix pattern 28 will support emission of a radiated signal with rotational wave front at a first frequency and mode combination corresponding to the first pitch and a second frequency and mode combination corresponding to the second pitch. Thus, the helix pattern, at a first pitch, supports emission of an OAM radiated signal at a first frequency and a first mode, and, at a second pitch, supports emission of the OAM radiated signal at one or both of a second frequency different than the first frequency or a second mode different than the first mode. In one embodiment, changing the pitch may be used to support two different frequencies, but the same mode at each pitch. In another embodiment, changing the pitch may be used to support two different modes, but the same frequency at each pitch. In still another embodiment, changing the pitch may be used to support two different frequencies and two different modes.

The support member 38 may be or may include any suitable mechanical manipulator, electromechanical manipulator or micro electro-mechanical system (MEMS) device to alter the axial length of the support member 38. A control circuit for controlling the axial length of the support member 38 may be present and may be part of the radio frequency transceiver 12, for example. An exemplary mechanical manipulator is a threaded member, such as a screw, that acts against a counterpart threaded opening at either the first end 34 or the second end 36 of the substrate 24. In one embodiment, the threaded member may be manually turned by a screwdriver or other tool. An exemplary electromechanical manipulator is a stepper motor that turns a threaded member or turns a cam that acts upon the substrate 24. Another exemplary electromechanical manipulator is memory wire. An exemplary MEMS device is a MEMS spring.

The implementation of a mechanically adjustable antenna for OAM communication enables more than one data stream between devices, but simplifies the feeding circuitry so that all antenna elements may be fed with the same signal. In principle, the elevation of the antenna elements is predetermined and/or mechanically adjusted to achieve the desired emission phase offset between antenna elements relative to the phase reference plane, which would other have to be obtained from a phase-shifting feeding network or from signal processing in case the where the antenna elements are fed with individual signals.

Multiple Helices

To increase the number of frequencies and modes supported by the antenna assembly 10, the antenna assembly 10 may include a second array of antenna elements 46 arranged in a second helix pattern 48. Additional arrays of antenna elements arranged in additional helix patterns 28 and 48 may form part of the antenna assembly 10.

Figure 9:
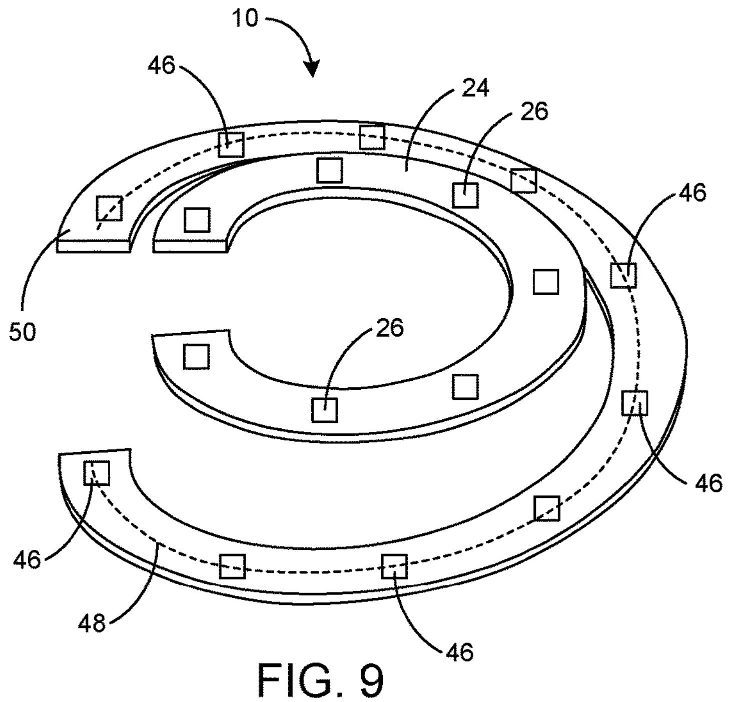
FIG. 9 is a schematic diagram of another representative antenna assembly according to the present disclosure.

With additional reference to FIG. 9, illustrated is an embodiment with a second array of antenna elements 46 that are supported by a second substrate 50. The second array of antenna elements 46 that are supported by the second substrate 50 may be arranged in similar manner to the array of antenna elements 26 described above. In one embodiment, each antenna element 46 of the second array is supported by the second substrate 50 at respective locations so that the antenna elements 46 of the second array are arranged in space in the second helix pattern 48. The second helix pattern 48 has a different radius than the radius of the helix pattern 28 of the first array of antenna elements 26. Also, the second helix pattern 48 has a pitch along an axis of the second helix pattern 48 that is typically different than the pitch of the helix pattern 28. In one embodiment, the number of antenna elements 26 is different than the number of antenna elements 46. The helix pattern with the larger radius may have more antenna elements. In one embodiment, the first substrate 24 is located at least partially inside a volume about which the second substrate 50 is arranged. Although not illustrated in FIG. 9, each substrate 24, 50 may be associated with a respective support member 38 that is either fixed in axial length or variable in axial length, as described above.

Similar to the antenna elements 26 of the first array, the arc length spacing of the antenna elements 46 of the second array along the second helix pattern 48 and the pitch of the second helix pattern 48 may be determined in advance of wireless communications so that, in a transmit mode, a second RF signal fed to each of the antenna elements 46 in the second array of antenna elements 46 results in emission of a second RF signal with a rotational radiated wave front (e.g., a helical or twisted wave front or having OAM properties). The frequency and mode of the second RF signal may have a frequency and/or mode that are different than the RF signal emitted by the antenna elements 26. In one embodiment, the second array of antenna elements 46 supports a different mode than the first array of antenna elements 26 since each array has a different spacing between adjacent pairs of antenna elements 26, 46. For instance, the phase offset introduced between adjacent pairs of antenna elements 26 may be 45 degrees, where the phase offset introduced between adjacent pairs of antenna elements 46 may be 90 degrees.

In one embodiment, the radio frequency transceiver 12 is manufactured with an antenna assembly 10 having one array. If a need arises to change the wireless communication capabilities of the radio communication device 14, then the second array may be added. For instance, the second substrate and antenna element array may be mounted radially inward or radially outward from the existing substrate and antenna element array. In one embodiment, no changes to the feeding network 22 are needed since a phase-shift feeding system that coordinates with the added antenna element array is not needed.

Receive Mode

The antenna assembly 10 may be used in a receive mode to receive radiated signals, including a radiated signal with a rotational radiated wave front (e.g., a helical or twisted wave front or having OAM properties). A radiated signal received by the antenna elements 26 of the antenna assembly 10 will result in each antenna element 26 outputting a corresponding received RF signal. Due to the elevation differences in the antenna elements 26, each antenna element 26 will introduce a different amount of phase offset to the radiated signal received at the antenna assembly 10 in the case where the radiated signal is received along the axis of the helix pattern 28. In other words, for a radiated signal received along the axis of the helix pattern 28, the received RF signals have phase offsets with respect to a phase reference plane that is normal to the axis of the helix pattern 28 that corresponds to the spacing of the antenna elements 26. Therefore, if the RF signal received at the antenna assembly 10 coordinates with the structure of the antenna assembly 10, it is possible that the RF signals output by the antenna elements 26 will be in-phase and/or will be coherently combinable (e.g., may be combined without being phase-shifted). Thus, the antenna assembly 10 may be matched to the emissions of a device that transmits radiated signals with a rotational wave front to the radio communications device 14 so that the radio communications device 14 optimally receives the radiated signals.

Aspects of the Disclosure

The following are various exemplary aspects of the disclosed antenna assembly 10.

Aspect 1: An antenna assembly (10), comprising:
a substrate (24); and
an array of antenna elements (26), each antenna element supported by the substrate at respective locations so that the antenna elements are arranged in space in a helix pattern (28), the helix pattern having a pitch along an axis (Z) about which the helix pattern turns, and arc length spacing (AL) of the antenna elements along the helix pattern and the pitch (P) are arranged so that, in a transmit mode, a radio frequency (RF) signal fed to each of the antenna elements results in emission of a radiated signal with a rotational wave front from the antenna assembly at a first frequency and a first mode.

Aspect 2: The antenna assembly of aspect 1, wherein the antenna elements in each adjacent pair of antenna elements are spaced apart by substantially the same arc length and by substantially the same axial length along the axis about which the helix pattern turns.

Aspect 3: The antenna assembly of aspect 2, wherein the RF signal that is fed to each antenna element has substantially no phase difference.

Aspect 4: The antenna assembly of aspect 3, wherein the radiated signal with rotational wave front emitted by the antenna assembly has orbital angular momentum (OAM) properties.

Aspect 5: The antenna assembly of any of aspects 1-4, wherein the substrate is helical and has a support surface that supports the antenna elements in the helix pattern.

Aspect 6: The antenna assembly of any of aspects 1-4, wherein the substrate is discontinuous in elevation with respect to the axis about which the helix pattern turns to respectively support each of the antenna elements in the helix pattern.

Aspect 7: The antenna assembly of any of aspects 1-6, wherein the pitch of the helix pattern is variable by physical manipulation of the substrate.

Aspect 8: The antenna assembly of aspect 7, wherein a physical change in axial elevation between each adjacent pair of the antenna elements changes a phase difference with respect to a phase reference plane between radiated signals emitted by each adjacent pair of the antenna elements to support emission of the radiated signal at at least one of a second frequency or a second mode.

Aspect 9: The antenna assembly of any of aspects 7-8, wherein the helix pattern, at a first pitch, supports emission of the OAM radiated signal at the first frequency and the first mode, and, at a second pitch, supports emission of the OAM radiated signal at at least one of a second frequency or a second mode.

Aspect 10: The antenna assembly of any of aspects 7-9, wherein the substrate has a first end (34) and a second end (36), and the antenna assembly further comprises a micro electro-mechanical system (MEMS) device (38) coupled to the first end and the second end, the MEMS device operable to vary the pitch of the helix pattern.

Aspect 11: The antenna assembly of any of aspects 7-9, wherein the antenna assembly further comprises a mechanical or electromechanical manipulator (38) that is operative to physically manipulate the substrate to change the pitch of the helix pattern.

Aspect 12: The antenna assembly of any of aspects 1-11, wherein the OAM radiated signal is emitted without feeding the RF signal to the antenna elements through a phase shifter to adjust phase of the RF signal.

Aspect 13: The antenna assembly of any of aspects 1-12, wherein each antenna element is a patch antenna element.

Aspect 14: The antenna assembly of any of aspects 1-13, wherein each antenna element supports emission of two signals with different polarizations.

Aspect 15: The antenna assembly of any of aspects 1-14, wherein each antenna element has a main axis, and the main axes are oriented parallel to one another so that each antenna element respectively emits a signal corresponding to the RF signal fed to the antenna elements with substantially the same polarization.

Aspect 16. The antenna assembly of any of aspects 1-15, wherein the substrate is a first substrate and the array of antenna elements is a first array of antenna elements, the antenna assembly further comprising:

a second substrate (50); and a second array of antenna elements (46), each antenna element of the second array supported by the second substrate at respective locations so that the antenna elements of the second array are arranged in space in a second helix pattern (48) having a different radius than a radius of the helix pattern of the first array of antenna elements, the second helix pattern having a pitch along an axis about which the second helix pattern turns, and arc length spacing of the antenna elements of the second array along the second helix pattern and the pitch of the second helix pattern are arranged so that, in a transmit mode, a second RF signal fed to each of the antenna elements in the second array of antenna elements results in emission of a second radiated signal with a rotational wave front at a second frequency and a second mode, at least one of the first and second frequencies or the first and second modes being different.

Aspect 17: The antenna assembly of aspect 16, wherein the first substrate is located at least partially inside a volume about which the second substrate is arranged.

Aspect 18: The antenna assembly of any of aspects 1-17, wherein, in a receive mode, a radiated signal received at the antenna assembly results in output of a corresponding received RF signal by each antenna element, and, for a radiated signal received along the axis of the helix pattern, the received RF signals have phase offsets with respect to a phase reference plane that is normal to the axis of the helix pattern that corresponds to the spacing of the antenna elements.

Aspect 19: A radio frequency transceiver (12) comprising the antenna assembly of any of aspects 1-18.

Aspect 20: A radio communication device (14) comprising the radio frequency transceiver of aspect 20.

CONCLUSION

Although certain embodiments have been shown and described, it is understood that equivalents and modifications falling within the scope of the appended claims will occur to others who are skilled in the art upon the reading and understanding of this specification.

What is claimed is:

1. An antenna assembly, comprising:

a substrate; and an array of individual antenna elements that are each fed with a respective radio frequency (RF) signal, each antenna element supported by the substrate at respective locations so that the antenna elements are arranged in space in a single ring of a helix pattern, the helix pattern having a pitch along an axis about which the helix pattern turns, and arc length spacing of the antenna elements along the helix pattern and the pitch are arranged so that, in a transmit mode, the RF signals fed to each of the antenna elements results in emission of a radiated signal with a rotational wave front from the antenna assembly at a first frequency and a first mode.

2. The antenna assembly of claim 1, wherein the antenna elements in each adjacent pair of antenna elements are spaced apart by substantially the same arc length and by substantially the same axial length along the axis about which the helix pattern turns.

3. The antenna assembly of claim 2, wherein the RF signal that is fed to each antenna element is the same RF signal and has substantially no phase difference relative to the other RF signals.

4. The antenna assembly of claim 3, wherein the radiated signal with rotational wave front emitted by the antenna assembly has orbital angular momentum (OAM) properties.

5. The antenna assembly of claim 1, wherein the substrate is helical and has a support surface that supports the antenna elements in the helix pattern.

6. The antenna assembly of claim 1, wherein the substrate is discontinuous in elevation with respect to the axis about which the helix pattern turns to respectively support each of the antenna elements in the helix pattern.

7. The antenna assembly of claim 1, wherein the pitch of the helix pattern is variable by physical manipulation of the substrate.

8. The antenna assembly of claim 7, wherein a physical change in axial elevation between each adjacent pair of the antenna elements changes a phase difference with respect to a phase reference plane between radiated signals emitted by each adjacent pair of the antenna elements to support emission of the radiated signal at at least one of a second frequency or a second mode.

9. The antenna assembly of claim 7, wherein the helix pattern, at a first pitch, supports emission of the OAM radiated signal at the first frequency and the first mode, and, at a second pitch, supports emission of the OAM radiated signal at at least one of a second frequency or a second mode.

10. The antenna assembly of claim 7, wherein the substrate has a first end and a second end, and the antenna assembly further comprises a micro electro-mechanical system (MEMS) device coupled to the first end and the second end, the MEMS device operable to vary the pitch of the helix pattern.

11. The antenna assembly of claim 7, wherein the antenna assembly further comprises a mechanical or electromechanical manipulator that is operative to physically manipulate the substrate to change the pitch of the helix pattern.

12. The antenna assembly of claim 1, wherein the OAM radiated signal is emitted without feeding the RF signal to the antenna elements through a phase shifter to adjust phase of the RF signal.

13. The antenna assembly of claim 1, wherein each antenna element is a patch antenna element.

14. The antenna assembly of claim 1, wherein each antenna element supports emission of two signals with different polarizations.

15. The antenna assembly of claim 1, wherein each antenna element has a main axis, and the main axes are oriented parallel to one another so that each antenna element respectively emits a signal corresponding to the RF signal fed to the antenna elements with substantially the same polarization.

16. The antenna assembly of claim 1, wherein the substrate is a first substrate and the array of antenna elements is a first array of antenna elements, the antenna assembly further comprising:

a second substrate; and a second array of antenna elements, each antenna element of the second array supported by the second substrate at respective locations so that the antenna elements of the second array are arranged in space in a second helix pattern having a different radius than a radius of the helix pattern of the first array of antenna elements, the second helix pattern having a pitch along an axis about which the second helix pattern turns, and arc length spacing of the antenna elements of the second array along the second helix pattern and the pitch of the second helix pattern are arranged so that, in a transmit mode, a second RF signal fed to each of the antenna elements in the second array of antenna elements results in emission of a second radiated signal with a rotational wave front at a second frequency and a second mode, at least one of the first and second frequencies or the first and second modes being different.

17. The antenna assembly of claim 16, wherein the first substrate is located at least partially inside a volume about which the second substrate is arranged.

18. The antenna assembly of claim 1, wherein, in a receive mode, a radiated signal received at the antenna assembly results in output of a corresponding received RF signal by each antenna element, and, for a radiated signal received along the axis of the helix pattern, the received RF signals have phase offsets with respect to a phase reference plane that is normal to the axis of the helix pattern that corresponds to the spacing of the antenna elements.

19. A radio frequency transceiver comprising the antenna assembly of claim 1.

20. A radio communication device comprising the radio frequency transceiver of claim 19.

21. The antenna assembly of claim 1, wherein the array of individual radiating antenna elements comprises at least four individual radiating antenna elements.

* * * * *